Patented Dec. 9, 1941

2,265,654

UNITED STATES PATENT OFFICE 2,265,654

DYESTUFFS AND DYESTUFF INTERMEDIATES FOR THE DIBENZANTHRONE SERIES AND A PROCESS FOR PREPARING THE SAME

Melvin A. Perkins, Wilmington, Del., assignor to E. I. du Pont de Nemours & Company, Wilmington, Del., a corporation of Delaware No Drawing. Application October 28, 1939,
Serial No. 301,752

11 Claims. (Cl. 260—354)

This invention relates to the preparation of new and valuable dyestuffs and dyestuff intermediates of the dibenzanthrone series and to a process for preparing the same.

It is well known that benzanthrone can be condensed with itself to give dibenzanthrone and that this condensation can be effected in several ways. Methods are described in the prior art for the direct condensation of benzanthrone to dibenzanthrone without the isolation of any intermediate, by means of certain alkaline condensing agents. In these condensations, however, it has been generally assumed that the benzanthrone is first condensed to the 2,2'-dibenzanthronyl and then ring closed, for it is known that 2,2'-dibenzanthronyl is formed by alkaline fusion of benzanthrone and that this 2,2'-dibenzanthronyl can be ring closed to dibenzanthrone by further caustic fusion or by means of acid condensing agents such as aluminum chloride. This two step process is also a recognized method for preparing dibenzanthrone. It is also known that benzanthrone can be condensed to the Bz1,Bz1'-dibenzanthronyl in acid solutions by means of oxidizing agents under controlled conditions, and that the Bz1,Bz1'-dibenzanthronyl can be ring closed to dibenzanthrone by mild alkaline condensations. Aluminum chloride and similar acid condensing agents do not convert Bz1,Bz1'-dibenzanthronyls to dibenzanthrone. Because the Bz1,Bz1'-linkage appears to exhibit a different directive influence than the 2,2'-linkage in the two dibenzanthronyls on the introduction of substituents such as nitro, amino, halogens, etc., derivatives of dibenzanthrone can be obtained over the one route that can not be obtained over the other. Since Bz1,Bz1'-dibenzanthronyl could only be ring closed to dibenzanthrone with alkaline condensing agents, which split out any halogen that might be present in the molecule and to a lesser degree split out nitro, and amino groups, the number of derivatives that could be prepared over the Bz1,Bz1'-dibenzanthronyl route has been limited.

It is therefore the object of this invention; to provide a process for ring closing Bz1,Bz1'-dibenzanthronyl without the use of alkaline condensing agents; to prepare new and valuable dyes and dyestuff intermediates of the dibenzanthrone series and to generally advance the art of dibenzanthrone chemistry by providing a method for preparing dibenzanthrones containing reactive substituents which may be employed as intermediates for the preparation of dyestuffs that can not be obtained from the isomeric 2,2'-dibenzanthronyl or already ring closed dibenzanthrone.

I have found that new and valuable dyes of the dibenzanthrone series may be prepared by heating Bz1,Bz1'-dibenzanthronyl or its derivatives in an inert organic solvent with a phosphorus halide. A condensation product is first formed which contains loosely bound phosphorus. On steam distilling this phosphorus containing compound or on treating it with acids the phosphorus is split off. The phosphorus containing compound, and the phosphorus free product obtained by steam distilling do not exhibit vat dyeing properties, however when either product is subjected to an acid hydrolysis it is converted to a vat dyestuff which exhibits the dyeing characteristics of the known dibenzanthrone compounds. In the treatment with phosphorus halides the dibenzanthronyl is halogenated to a greater or lesser extent, depending upon the conditions under which the reaction is carried out and upon the particular phosphorus halide employed. The new dyestuffs dye cotton from the usual alkaline hydrosulfite vat in blue to gray to black shades of good fastness properties.

The condensation may be carried out in inert organic solvents such as nitrobenzene, ortho-dichlorobenzene, trichlorobenzene, ortho-nitrotoluene, naphthalene etc. The reaction may also be carried out in the absence of added solvent provided sufficient phosphorus halide is employed to act as the diluent. The degree of halogenation that takes place during the condensation reaction varies somewhat depending on the particular phosphorus halide employed and the temperature at which the condensation is carried out. Temperatures of from 140° C. to 190° C. are preferred although somewhat higher or lower temperatures may be employed.

The hydrolysis of the intermediate product to dyestuff, as illustrated in the examples, may be effected with strong acids such as sulfuric acid, phosphoric acid, chlorosulfonic acid, etc. at 50 to 120° C. The exact change in constitution of the non-dyeing intermediate to the dyestuffs brought about by the acid treatment is not known. When the phosphorus-containing intermediate is treated with the acid the phosphorus and some chlorine is split out with the conversion of the intermediate directly to a vat dyestuff.

Other halogen-, nitro- or amino- or other substituted Bz1,Bz1'-dibenzanthronyls may be converted to dyestuffs in the same manner as illustrated in the following examples, provided the substituents (if non-replaceable) are not present in the 2,2'-position.

This process is particularly applicable to the preparation of new gray to black dyestuffs from the nitro-, or amino-Bz1,Bz1'-dibenzanthronyls for the amino and nitro groups are not split off during the condensation, thereby giving direct dyeing grays and blacks that exhibit excellent fastness properties.

The following examples are given to illustrate the invention. The parts used are by weight.

Example 1

To a suspension of 20 parts of Bz1,Bz1'-dibenzanthronyl in 200 parts of nitrobenzene, 20 parts of phosphorus pentachloride are added, and the mass is stirred while heating gradually to 140° C. The color changes from yellow through green to very dark reddish brown. After gas evolution ceases, the mass is cooled and filtered. The solid is washed with nitrobenzene, then with acetone, and then dried. It is an almost black dry solid and contains 13.4% chlorine. It is practically insoluble in cold concentrated sulfuric acid but upon heating, solution takes place with the formation of a bright bluish-green coloration. Upon heating 10 parts of this intermediate with 150 parts of concentrated sulfuric acid at 50 to 100° C., hydrogen chloride is evolved and a dark blue color develops. After heating for three hours at approximately 100 C. there is no apparent further change. The mass is poured into 1500 parts of water, filtered and the filter cake is washed acid free and dried. The product is a vat dyestuff dyeing cotton in dark blue shades from a violet vat.

Example 2

By using 24 parts of dinitro-Bz1,Bz1'-dibenzanthronyl, (obtainable by nitration of Bz1,Bz1'-dibenzanthronyl in nitrobenzene) in the above example in place of the unsubstituted dibenzanthronyl and heating with nitrobenzene and phosphorus pentachloride to 180-185° for two hours, an analogous product is obtained. This product, which is a very dark reddish-brown solid, upon hydrolysis according to this example gives an intense red-violet solution in the sulfuric acid. The final product isolated from the sulfuric acid solution is a black solid which dyes cotton in neutral gray to black shades from a violet-blue vat.

Example 3

A suspension of 20 parts of Bz1,Bz1'-dibenzanthronyl in 170 parts of nitrobenzene is heated to 170° C. for one-half hour. At 165-175° C., a solution of 15 parts of phosphorus oxychloride in 30 parts of nitrobenzene is dripped in over a period of 2 hours. The mixture is stirred for 2 hours additional at 165-175° C., then cooled, filtered, washed with benzene and finally with carbon tetrachloride until the filtrate becomes clear. The resulting product when dried is a nearly black solid which gives a dark reddish-brown chalk mark when rubbed on a white surface. It analyzes 8.29% chlorine and 1.34% phosphorus. On treatment of this product in concentrated sulfuric acid as in Example 1 a product is obtained which dyes cotton in dark blue shades from a wine colored vat. This compound dissolves in concentrated sulfuric acid with a violet color.

A similar product is obtained by using phosphorus trichloride instead of oxy-chloride in this example.

Example 4

To a mixture of 200 parts of dinitro-Bz1,Bz1'-dibenzanthronyl (obtained by nitration of Bz1,Bz1'-dibenzanthronyl in nitrobenzene) and 1400 parts of nitrobenzene at 170° C., a mixture of 125 parts of phosphorus oxychloride and 250 parts of nitrobenzene is added dropwise over a 4 to 5 hour period. The fumes are allowed to escape through a condenser. The reaction mass is stirred at 170-175° C. for an additional four hours, then cooled under agitation and filtered. The filter cake is washed with nitrobenzene, then reslurried in benzene and refiltered, and finally washed with carbon tetrachloride. A very high yield is obtained of a dark bronzy solid (violet-brown chalk mark when rubbed out on a white surface) which analyzes 2.36% N, 11.18% Cl and 5.78% P. The phosphorus content of this product is apparently due to the formation of a relatively unstable addition compound or ester, which when the reaction mass is steam distilled in the presence of excess sodium carbonate is converted to a product that contains no phosphorus. The hydrolysis of the phosphorus-containing compound or the steam distilled product in sulfuric acid at 90-95° C. for about 3 hours, gives a dyestuff that is phosphorus free. This new dyestuff dyes and prints cotton directly in neutral gray to black shades of good fastness, especially to light. Analysis and color reactions indicate that this new dye is largely amino-dichlorodibenzanthrone although it exhibits entirely different properties from similarly substituted products made directly from dibenzanthrone.

Example 5

Twenty parts of the phosphorus oxychloride reaction product of Bz1,Bz1'-dibenzanthronyl (see Example 3) are stirred into 300 parts of 96% sulfuric acid and 12 parts of hydroxylamine sulfate and 1 part of ferrous sulfate ($FeSO_4 \cdot 7H_2O$) are added. The mixture is heated gradually to 90-100° C. and maintained for 3 hours, after which it is further heated to 160-165° C. for an additional hour. The mass is cooled and the dyestuff precipitated by dropwise addition of water followed by filtration to separate more soluble impurities. A product is obtained which dyes cotton directly in gray to black shades with a greenish cast.

These new colors may also be converted to the leuco sulfuric acid esters in the known manner when they are to be used in a water soluble form. They may also be used as pigments in the known lacquer printing processes.

The expressions "phosphorus halides" and "phosphorus chlorides" are used in the specification and claims in the broad sense to include the pentahalides, trihalides and oxyhalides or the corresponding chlorine compounds.

I claim:

1. The process which comprises heating a Bz1-Bz1'-dibenzanthronyl with a phosphorus halide, and treating the resulting intermediate with a strong acid to convert it into a vat dyestuff.

2. The process which comprises heating a nitro-Bz1,Bz1'-dibenzanthronyl with a phosphorus chloride and heating the resulting intermediate with a strong acid to convert it into a gray to black dyeing vat dyestuff.

3. The process which comprises heating an amino-Bz1,Bz1'-dibenzanthronyl with a phosphorus chloride and heating the resulting intermediate with a strong acid to convert it into a gray to black dyeing vat dyestuff.

4. The process which comprises heating a di-nitro-Bz1,Bz1'-dibenzanthronyl with a phosphorus chloride and heating the resulting intermediate with a strong acid to convert it into a gray to black dyeing vat dyestuff.

5. The process which comprises heating a di-amino-Bz1,Bz1'-dibenzanthronyl with a phosphorus chloride and heating the resulting intermediate with a strong acid to convert it into a gray to black dyeing vat dyestuff.

6. In the process for preparing vat dyestuffs of the dibenzanthrone series, the step which comprises heating a Bz1,Bz1'-dibenzanthronyl with a phosphorus halide to convert it to an intermediate which on treatment with a strong acid can be converted into a vat dyestuff of the dibenzanthrone series.

7. In the process for preparing gray to black vat dyestuffs of the dibenzanthrone series, the step which comprises heating a nitro-Bz1,Bz1'-dibenzanthronyl with a phosphorus chloride to convert it to an intermediate which on treatment with strong acids can be converted into a vat dyestuff of the dibenzanthrone series.

8. In the process for preparing gray to black vat dyestuffs of the dibenzanthrone series, the step which comprises heating an amino-Bz1,Bz1'-dibenzanthronyl with a phosphorus chloride to convert it to an intermediate which on treatment with strong acids can be converted into a vat dyestuff of the dibenzanthrone series.

9. A halogen containing vat dyestuff obtained by the process of claim 1.

10. A chlorine containing gray to black dyeing vat dyestuff obtained by the process of claim 2.

11. A chlorine containing gray to black dyeing vat dyestuff obtained by the process of claim 4.

MELVIN A. PERKINS.